United States Patent [19]
Long et al.

[11] Patent Number: 5,320,464
[45] Date of Patent: Jun. 14, 1994

[54] MODULAR CONTAINMENT SYSTEM

[76] Inventors: Thomas G. Long, 13 Fairhaven Rd., Havertown, Pa. 19083; Donald L. Kleykamp, 6014 Gothic Pl., Dayton, Ohio 45459

[21] Appl. No.: 10,141

[22] Filed: Jan. 28, 1993

[51] Int. Cl.$^5$ ............................................. B60P 7/15
[52] U.S. Cl. .................................. 410/144; 410/143; 410/151; 410/152
[58] Field of Search .......................... 414/143–153

[56] References Cited

U.S. PATENT DOCUMENTS

| | | | |
|---|---|---|---|
| 1,238,874 | 9/1917 | Bield | 410/143 |
| 2,467,681 | 4/1949 | McKinney | 410/152 |
| 2,942,560 | 6/1960 | Shultz | 410/144 |
| 3,114,338 | 12/1963 | Schroeder et al. | 410/146 |
| 3,367,286 | 2/1968 | Jantzen | 105/369 |
| 3,431,015 | 3/1969 | Breen et al. | 410/152 |
| 4,932,817 | 6/1990 | Mattare | 410/152 |
| 4,982,922 | 1/1991 | Krause | 248/222.2 |
| 5,028,184 | 7/1991 | Krause | 410/143 |
| 5,037,256 | 8/1991 | Schroeder | 410/143 |

FOREIGN PATENT DOCUMENTS 1189321  3/1965  Fed. Rep. of Germany ...... 410/144

*Primary Examiner*—Michael S. Huppert
*Assistant Examiner*—Gregory A. Morse
*Attorney, Agent, or Firm*—Reuben Wolk

[57] ABSTRACT

A modular containment system for mounting within a cargo container, the system having a pair of opposing retaining members, transverse members such as beams engaging the retaining members, and adapters interlocked with the retaining members. The adapters are designed to secure the system within recesses in opposing walls of the container, and may have several configurations depending on the method of securing. The system is installed in selected portions of the recesses to secure the cargo at the rear end of the container, or at other locations forward of the rear end.

26 Claims, 3 Drawing Sheets

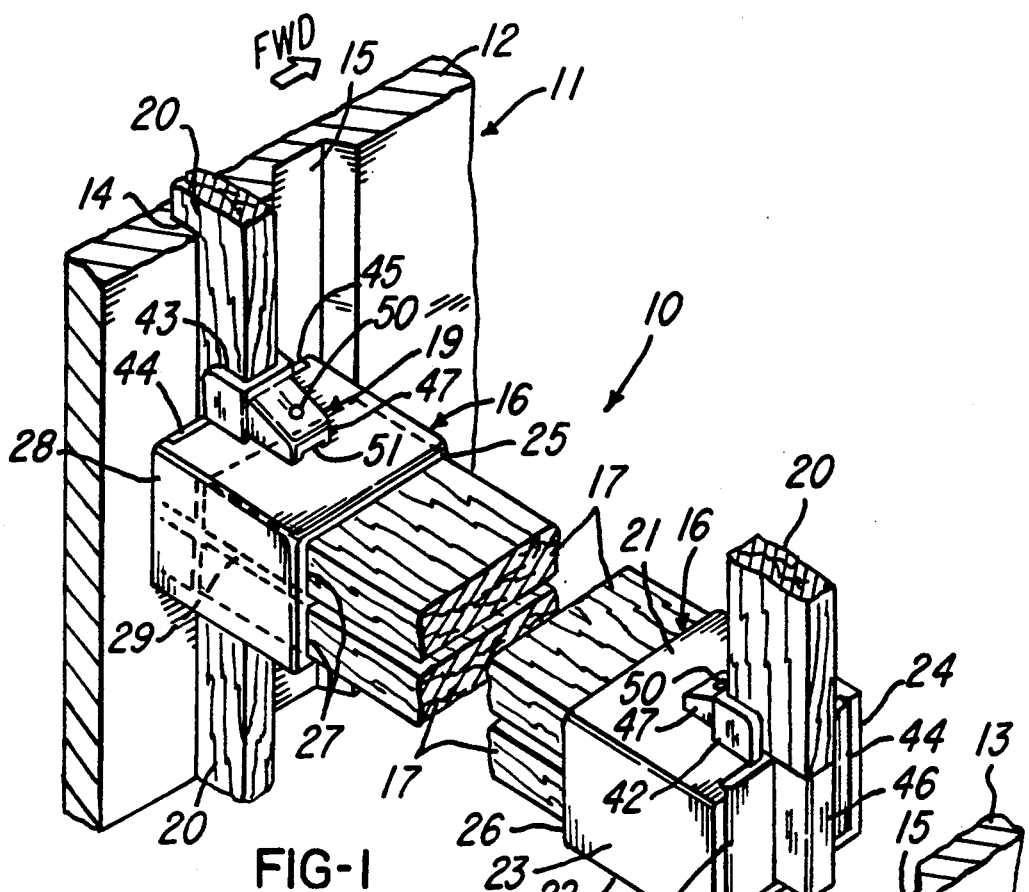
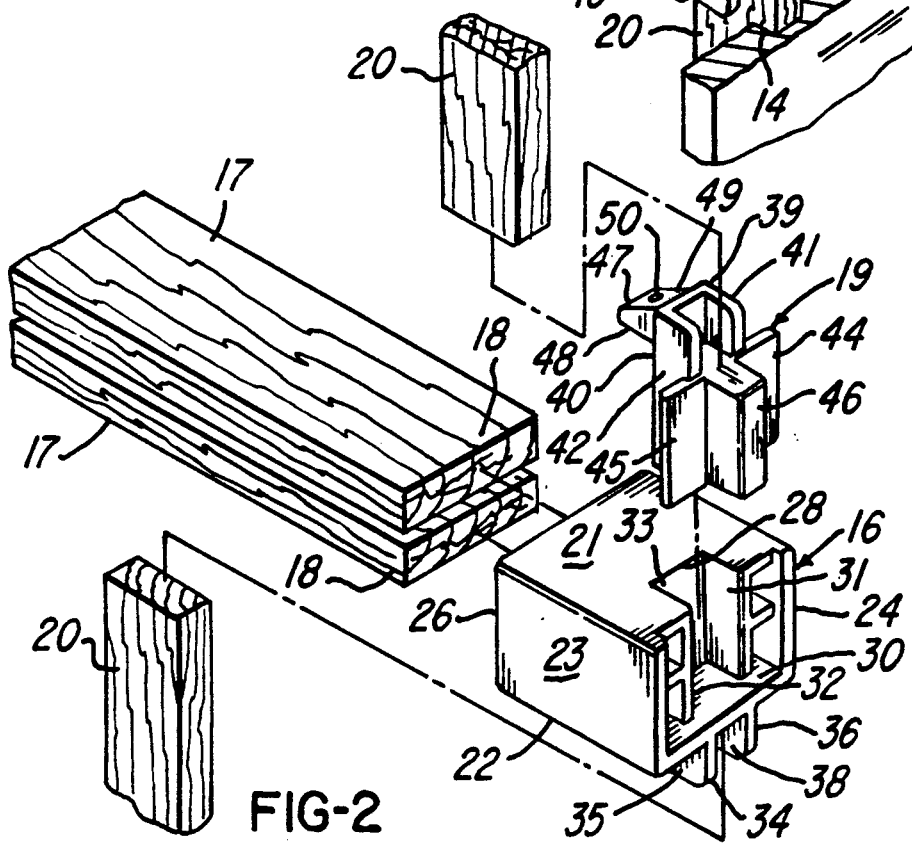

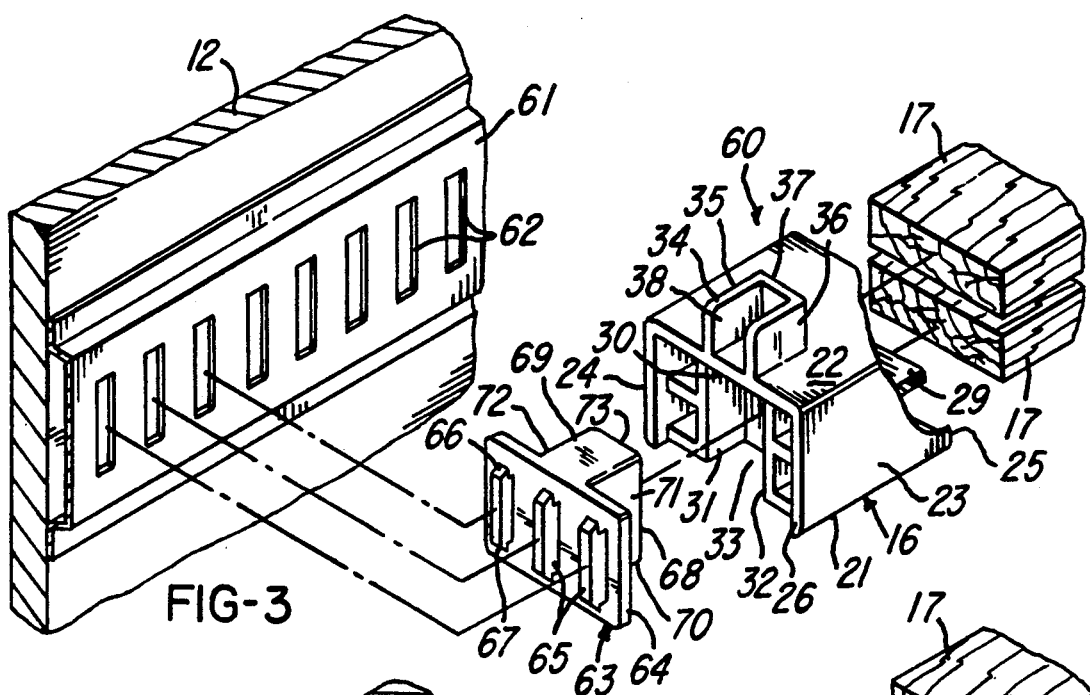
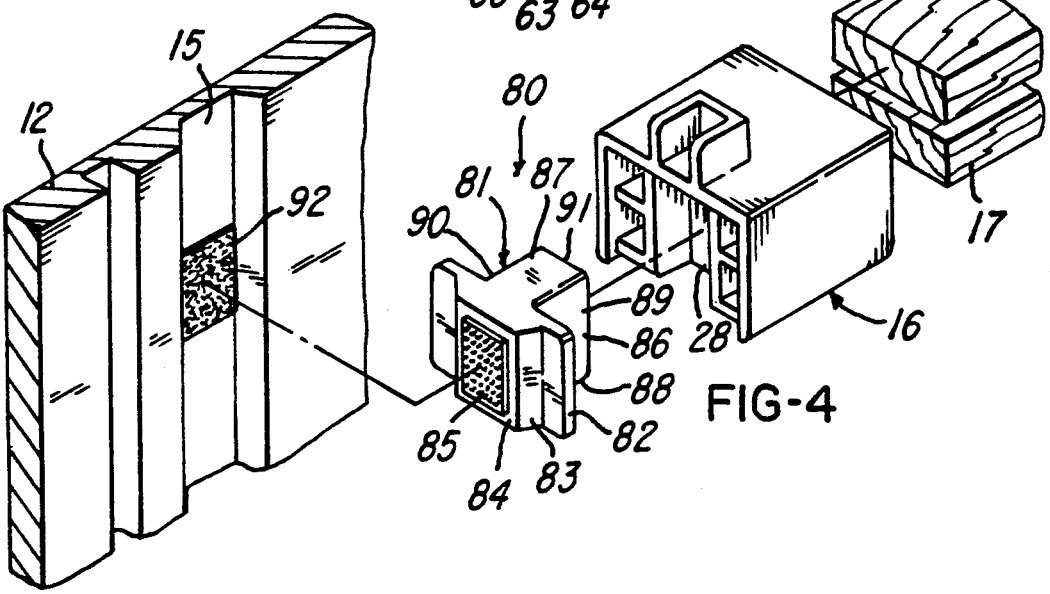
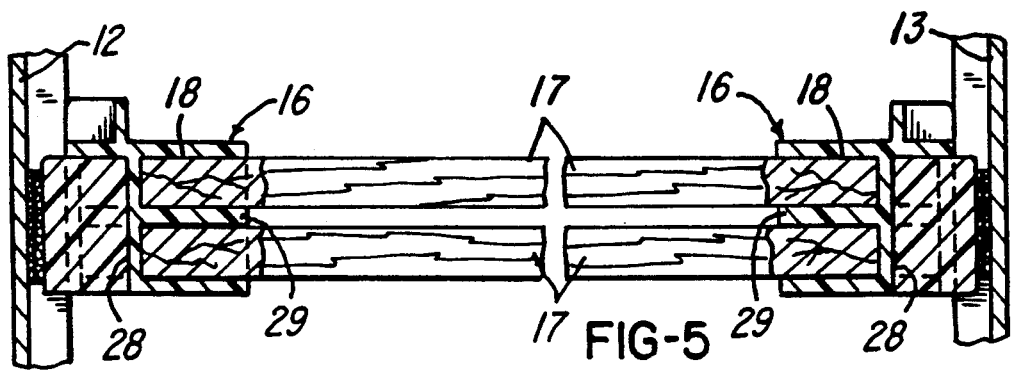

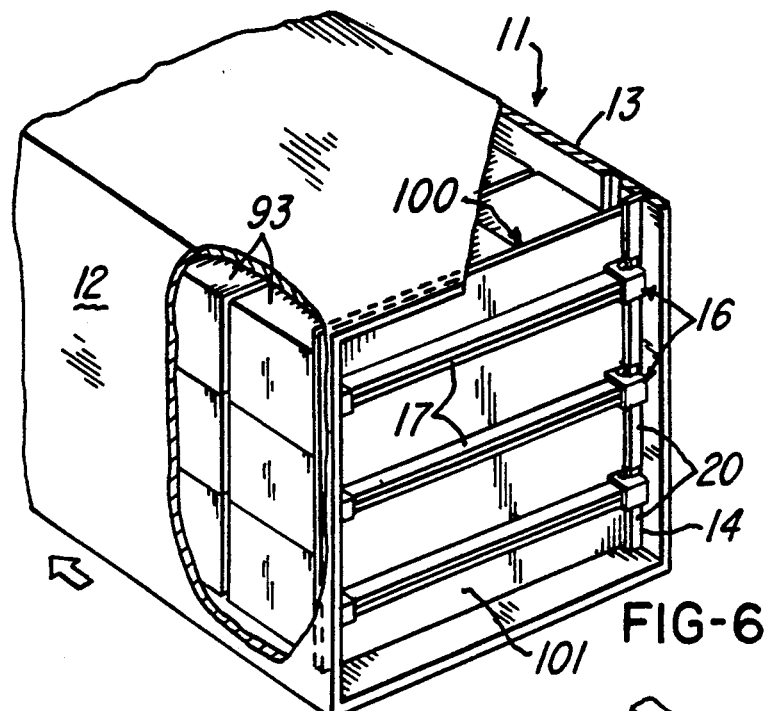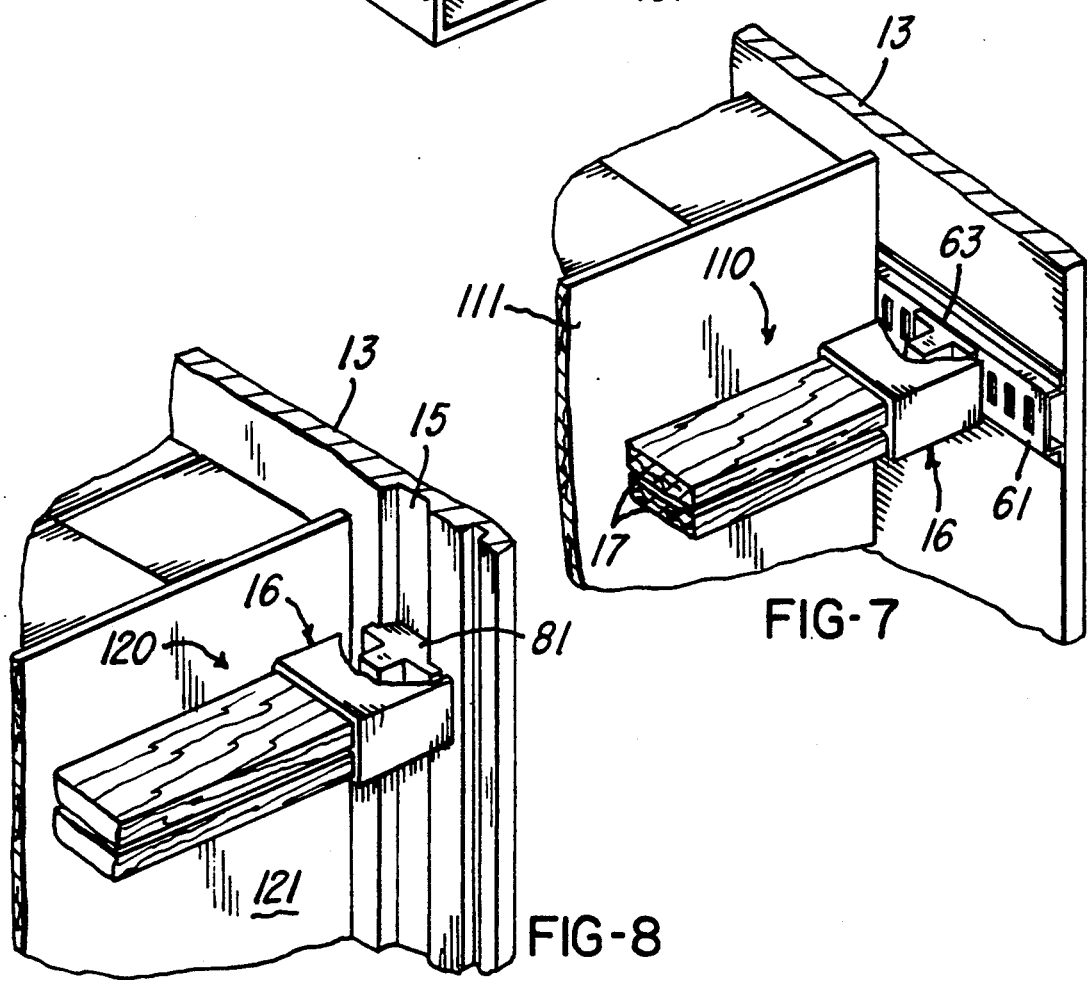

MODULAR CONTAINMENT SYSTEM

BACKGROUND OF THE INVENTION

The present invention relates to a modular containment system for retaining cargo within a cargo container, and particularly to such a system which is quickly assembled and secured to the walls of the container, and is easily disassembled.

PRIOR ART STATEMENT

Cargo container systems are known wherein brackets and support beams are used to fit into channels in cargo walls, such as shown in U.S. Pat. No. 5,028,184, issued to Krause. It is also known to provide a similar system which may be secured to longitudinally extending rails, known as E-Tracks or E-Rails, which are secured to the container walls; see U.S. Pat. No. 4,982,922 issued to Krause and U.S. Pat. No. 3,367,2866 issued to Jantzen. It is also known to provide longitudinal or transverse structural members secured to the container walls, into which support beams are inserted, as described in U.S. patent application Ser. No. 07/870,901, filed Apr. 20, 1992 by Long (one of the co-inventors herein).

SUMMARY OF THE INVENTION

The present invention provides for a cargo containment system which is modular; that is, one which comprises separate units providing versatility and flexibility. The system is adapted to be removably attached to cargo container walls for the purpose of securing cargo within the container. The container may be portable or may be a truck trailer or a railroad box car. The system comprises a pair of retaining members which are secured to opposite walls of the container, into which transverse supporting members are inserted, these members being in direct contact with the cargo. The members are pre-assembled to a fixed length equalling the width of the container, and secured to the walls by means of adapters which interlock with the retaining members. Various forms of adapters may be selectively utilized, providing versatility in installing the system.

The adapters may be used in securing the cargo at the rear end of the container, by inserting them into opposing channels in the walls, at any desired height. This may be done in conjunction with spacers also inserted into the channels, such as utilized by Krause in his '184 patent, the spacers being pre-selected in length to install the system at desired heights above the floor. In this construction, the adapters are designed not only to interlock with the channels, but to lock the pre-assembled retaining members, the support members, and the spacers securely in place. The present system provides important advantages over the Krause '184 system intended for the same purpose, as follows:

1. In the Krause system, the beam assembly 14 must have a transverse length between ends 16 and 18 which is less than the width of the container, in order to make the installation possible. When installed in the pockets 20, the total length of the beams and brackets between the outer surfaces of projections 30 must be equal to the distance between the opposite sides 37 (this number not appearing in the drawings) of the container. Thus, when the projections 30 are slid into the recesses 34, the ends 16 and 18 must be slid away from the outer walls 32 of the pockets 20, thus leaving a gap in the pockets equal to the depth of the projections. This creates a shear load on the beam assembly because the beams are not fully retained within the pockets. By contrast, Applicants' system utilizes separate adapters to permit the ends of the transvers supporting beams to extend into the full depth of the pockets or openings of the retaining member. This enables the beams to be fully retained within the pockets so that the walls of the pockets provide the entire support for the ends of these beams. In this design, the separate adapters are inserted into the recesses, and at the same time they lock the retaining member in place. This will be more fully described below.

2. By utilizing a separate adapter, it is much simpler to make the assembly because it is unnecessary to maneuver the assembly as Krause must do, as the adapter performs the locking action of the retaining members, the support members being installed in the desired position.

A modification of the invention permits the use of the same retaining members with adapters which have been pre-assembled into opposing recesses in the container walls by semi-permanent securement, such as commercial hook-and-loop fasteners known under the trademark "Velcro". In this arrangement, one of the fastener members is secured to the inner face of the recess, and the other to the outer surface of the adapter. Other conventional fastening means, such as adhesives may be used. Alternatively, the adapter may be secured to an E-Track, of the type shown in Krause '922, or in Jantzen. In either case, the adapter is installed first, and the assembled retaining members and support beams dropped onto the adapters; the retaining members are designed so that they may be turned upside down with respect to the primary use described above. The same advantages apply to the E-Track use; namely, the maximum length of the support beams is utilized to minimize shear, and the separate adapters simplify installation. It should be noted that the Krause '922 patent may drop the ends 46 of the beams 22 into the bracket 20. However, these ends must then be secured at their upper surfaces by bolts 24 to prevent the beams from bouncing out of the opening 42. Applicant avoids this problem by reversing the retaining members to which the support beams have been pre-assembled, and dropping them onto the adapter to lock the assembly without using the bolt.

3. The present system lends itself to a prior pre-assembly for providing a bulkhead or wall at the rear end of the container, or at some intermediate portion of the container, when a solid bulkhead is desired. This is accomplished by securing the bulkhead to the support members either before or after assembly into the retaining members. This pre-assembly is placed over the spacers as indicated above and locked in place by the adapters, or dropped onto the adapters previously attached as discussed above and as further described below.

It is a principal object of the invention to provide a containment system which is modular, and utilizes versatile retaining members which engage with a variety of adapters for varied purposes.

It is a further object to provide a system in which the modules are simple to assemble and disassemble.

It is a still further object to associate the modules with the walls of the container in a simple and efficient manner.

It is another object to utilize the system in various areas of the container.

It is yet another object to assemble the system in a manner which minimizes shear on the support members.

It is still another object to create a bulkhead assembly that is easily installed within the container.

These and other objects, features and details of the invention will become apparent from the embodiments presented in the following specification, drawings and claims.

DESCRIPTION OF THE DRAWINGS

FIG. 1 is a perspective view of one form of the novel container system installed in a container.

FIG. 2 is an exploded view of portion of the system of FIG. 1.

FIGS. 3 and 4 are exploded views similar to FIG. 2, illustrating two modified forms of the invention.

FIG. 5 is a cross-sectional view of the container system of FIG. 4.

FIGS. 6, 7, 8 are perspective views of further forms of the invention.

DESCRIPTION OF A FIRST EMBODIMENT

Referring to the drawings, FIGS. 1 and 2 illustrate one form of the modular containment system 10, whose purpose is to brace cargo within a cargo container 11, whether one continuous section or separated sections. The entire container is not shown in these figures, but is similar to the container shown in FIG. 6. The container has walls 12 and 13 in which a series of vertically extending, horizontally spaced recesses are located. At the rearmost ends of the walls the recesses 14 have a rectangular cross section, while the other recesses 15 have a trapezoidal cross section. The system is designed to interfit into opposing recesses 14 if support is required at the ends of the container; or into opposing ones of selected recesses 15 if support is required at other positions in the container. The novel system comprises two retaining members or brackets 16, a pair of support members 17 in the form of beams such as 2×6 wooden beams whose ends 18 are inserted into the retaining members, and a pair of adapters 19 which serve a multiple purpose of fitting into the upper surface of the retaining members while locking into the recesses 14 and against spacers 20 which are inserted vertically into the recesses. The spacers are preferably made of 2×4 wooden strips, although these spacers, as well as support members 17, may be made of a rigid plastic material or may be hollow metal members. The retaining members 16 and the adapters 19 are preferably made of a strong, lightweight high impact plastic material; a preferred material being poly-dicyclo pentadiene. Other suitable materials include polyolefins, polycarbonate or ABS.

The retaining members 16 are in the form of a generally rectangular housing having an upper surface 21, a lower surface 22, two side surfaces 23 and 24, inner surface 25 and outer surface 26. The term "outer" refers to the direction of the walls of the container, and the term "inner" refers to the direction toward the center of the container. The inner surface has parallel openings 27 extending through the retaining member to the outer wall 28, and separated by a divider 29, as also shown in FIG. 5. Beyond the outer surface is an open area having a lower wall 30 outwardly of the outer wall, also having offset side walls 31 and 32 which combine with wall 28 to define an aperture 33. Extending beyond the lower surface 22 is an extension segment 34 having side walls 35 and 36 and an inner wall 37, these walls defining a channel 38.

The adapter 19 is a multi-surface module consisting of a body 39 having an inner wall 40 and side walls 41 and 42, all of which define a channel 43 which has the same width as channel 38 of member 16. Two arms 44 and 45 extend laterally from the body 39, and another arm 46 extends outwardly at right angles to arms 44 and 45. An extension 47 extends inwardly from the wall 40 parallel to arm 46, and has a lower surface 48 and an upper surface 49. A nail hole 50 extends through the extension 47.

The system is assembled by inserting the ends 18 of the support members 17 into the openings 27 of the retaining members 16, so that these ends contact the outer walls 28 thereof. This creates a sub-assembly of the opposite retaining members and the support members which minimizes shear load on the support members by fully enclosing the ends within the openings so that the walls fit tightly against the ends and form the sole support therefor. This relationship is also shown in FIG. 5 which illustrates a modified form of the invention. It should be understood that if desired, a single 4×6 or other dimensioned beam may be inserted into a single opening of matching dimensions. Spacers 20 are inserted vertically into opposing recesses 14, the length of these spacers being determined by the desired height at which the system is to be located; and the sub-assembly is placed on the upper ends of the spacers, the inner portion of these ends fitting within the channels 38. The sub-assembly is then supported by these spacers in a vertical direction. The next step is to place the adapters 19 onto the upper surfaces of the retaining members which effectively locks the sub-assembly in place and completes the entire system. When this is done each arm 46 fits into a recess 14 to lock its retaining member against fore and aft movement; at the same time the arms 44 and 45 lock into the opening formed by lower wall and side walls 24. These relationships are best shown at the right hand side of FIG. 1. To complete the assembly, if desired, a nail may be driven through the hole 50 into a member 17. The assembly is now locked in all directions but may be easily disassembled by inserting a tool into slot 51 to remove the nail, and then reversing the assembly procedure.

The systems may be used in multiple form. After assembly of the first system and installation on spacers 20, additional spacers 20 are inserted into the channels 43 on the upper surfaces of the adapters as shown. These spacers are also cut to the desired length, depending on the selected vertical spacing of the additional systems. An identical pre-assembly of retaining members and support members is placed in the recesses and on top of the ends of the spacers, and additional adapters installed in the same manner. This may be repeated as required.

MODIFICATIONS

The versatility of the containment system can be appreciated by the showing of FIGS. 3 and 4. In FIG. 3, the system 60 is installed without the use of the spacers; instead, a pair of tracks 61, called E-Rails, are secured to the opposing walls and extend forward and aft at right angles to the recesses. These E-Rails are similar to the ones shown in the Krause '033 patent. The tracks have vertical slots 62 spaced longitudinally, and are secured to the walls by conventional fastening means at selected heights. The system 60 utilizes the same pre-assembly of retaining members 17 as described above, but employs different adapters 63, each having a flange 64 with integrally formed extensions 65, the extensions having upper segments 66 and lower segments 67 spaced from the flange. The extensions are dimensioned so that the segments can lock the adapter into the slots. Extending inwardly at right angles to the flange is a solid body member 68 having an upper surface 69, a lower surface 70, side surfaces 71 and 72, and inner surface 73. This system is assembled by first making the pre-assembly of retaining members 16 and support members 17, as described above. The adapters 63 are locked into opposing slots of the E-Rails by engaging the segments 66 and 67; this is done with a rocking motion such as shown in Krause patent '933. The pre-assembly is inverted as in the FIG. 3 system and placed over the locked adapters so that each body 68 fits into the aperture 33 of the retaining member. The upper surface 69 is then in supporting contact with the wall 30 defining the upper surface of the aperture, and the side surfaces 71 and 72 fit tightly against the side walls 31 and 32 of the aperture to lock the adapter and retaining member together. Since the E-Rails extend along the walls in a forward and aft direction, it is a simple matter to choose any location for installing the system depending on the location of the cargo to be retained. Just as in the first form of the invention, a series of systems may be vertically aligned by installing a series of E-Rails in a vertical durection, and spacing the systems along the E-Rails as desired.

FIG. 4 illustrates the container system 80, which is installed on opposing trapezoidal recesses 15 at selected fore and aft positions of the wall, depending on the location of the cargo to be retained. The system utilizes the same pre-assembly of retaining members and support members described above, but employs different adapters 81. Each of these adapters has a flange 82 with an outwardly extending trapezoidal section 83 that matches the cross-section of recesses 15. At the outermost surface 84 is one portion of a hook and loop fastener 85, such as a fastener sold under the trademark "Velcro". An industrial grade fastener is preferred because of superior strength. Extending inwardly at right angles to the flange is a solid body member 86 which is identical to body member 68, having an upper surface 87, a lower surface 88, side surfaces 89 and 90, and inner surface 91. As in the system 60, a pre-assembly is made of the retaining members and the support members. The adapters 82 are mounted in opposing recesses by engaging their fastener members 85 to a mating member 92 which has been secured to selected opposing areas of the recesses by an adhesive. The pre-assembly is also inverted, as in FIG. 3, and placed over the secured adapters 82 so that each body 86 fits into the apertures 33 of the retaining member. The upper surface 87 is then in supporting contact with the wall 30 defining the upper surface of the aperture, and the side surfaces 89 and 90 fit tightly against the side walls 31 and 32 of the apertures 33 to lock the adapter and retaining member together. Since the recesses 15 are repeated along the wall, the fasteners may be applied at desired locations. Also, as in other described systems, a series of systems may be installed in vertical alignment at desired heights. It is also contemplated that in lieu of the hook and loop fasteners, the surfaces 84 of the adapters may be installed directly in the recesses by means of an adhesive.

ADDITIONAL MODIFICATIONS

It is sometimes desirable to provide a solid wall for retaining the cargo 93 within the container, and FIGS. 6, 7 and 8 illustrate the use of the systems in such a manner. In FIG. 6, three pre-assemblies of retaining members 16 and support members 17 are shown attached to a bulkhead 101 by nails or screws (not shown) and secured in place by adapters 19 to form a new modular containment system 100. This system is secured in a manner similar to that shown in FIG. 1 in which spacers 20 are placed in opposing and recesses 14 and are inserted into channels 38 of the retaining members. As is shown, the pre-assembled unit is placed with the bulkhead forward of the members 16 so that the adapters are placed in the lowermost retaining members, and other spacers 20 are placed into the channels 43 of the adapters, and so on until all of the systems are locked in place. The bulkhead may extend the full height of the container opening to act as a rear door, or may be shorter in height or narrower in width if used in conjunction with an existing door. FIG. 6 illustrates three systems, but two, four or more may be utilized at desired heights and for varied strength requirements.

FIG. 7 is a fragmentary illustration of the same concept of forming an assembly utilizing a bulkhead 111 with systems 110, of which only one is shown. In this modification the adapters 63 are first mounted on the opposing E-Rails and the retaining members 16 are assembled to supporting members 17, to which the bulkhead is attached. Two, three or more systems are utilized and this pre-assembly, similar to that of FIG. 2 is placed so that the apertures 33 drop onto the bodies 68 of the adapters for support. The assembly may be placed at any convenient location or locations in a fore and aft direction of the container. The bulkhead may extend to the full height of the container, or may be shorter or narrower to fit the requirements.

FIG. 8 is a fragmentary illustration of systems 120 attached to a bulkhead 121. The adapters 81 are mounted in the opposing recesses 15 in the same manner as in FIG. 4. A plurality of the systems 120 are located in desired fore and aft and vertical locations in the container. After the adapters are mounted, the pre-assembled bulkhead, supporting members 17, and retaining members 16 are placed over the adapters so that the bodies 86 are inserted into apertures 33 of the retaining members to fully support the pre-assembly. Two or more systems 120 may be used. In both FIG. 7 and 8 systems, disassembly is simply done by removing the whole assembly, removing the nails or screws, and separating the modules.

Although FIGS. 6, 7 and 8 illustrate a pre-assembly of all members before mounting in the recesses, any of these can be utilized in other ways. For example the retaining members, support members and adapters may be assembled in the manner shown in FIGS. 1, 2 and 3, utilizing multiple vertically aligned systems. The bulkheads 101, 111, or 121 are then attached at a later time by driving screws through the bulkhead into the retaining members. This arrangement is disassembled by removing the screws and the modules forming the systems.

Other embodiments within the scope of the invention are also contemplated, it being understood that the above embodiments are merely exemplary.

We claim:

1. In a cargo container having opposite side walls with vertical recesses therein, a modular containment system comprising at least two retaining members having openings extending inwardly of said walls and support members extending between said walls and having ends inserted into said openings so that said retaining members engage and support said support members; the improvement wherein said retaining members include apertures opposite said opening and said system further comprises separate removable adapters having body members interlocked with said apertures of said retaining members, said adapters having additional means for securing said system within selected ones of said recesses whereby said adapters interlock said retaining members within said vertical recesses subsequently to said engaging of said retaining member and support member.

2. The system of claim 1 wherein said support members extend virtually the entire width of said container, said support members having a fixed length subsequent to being secured within said recesses.

3. The system of claim 1 wherein said support members extend into the full depth of said openings so that said openings fully enclose said ends to minimize shear on said support members.

4. The system of claim 1 including vertical spacer means inserted into selected ones of said recesses, said retaining members being mounted on said spacer means and said adapters being interlocked with said retaining members and said spacer means and also inserted into said recesses.

5. The system of claim 4 wherein said retaining members have upper and lower surfaces each including apertures therein extending parallel to said recesses, said retaining members being mounted on said spacer means by placement of said spacer means into the lower ones of said apertures and said adapters are placed into the upper ones of said apertures.

6. The system of claim 4 wherein said adapters have channels engaging said spacer means and projections interlocked with upper ones of said apertures in said retaining members.

7. The system of claim 1 wherein said adapters and said recesses each have opposite interengaging segments of hook and loop fasteners.

8. The system of claim 1 further comprising structural members secured to opposing walls and extending at right angles to said recesses, said adapters interengaging a portion of said structural members.

9. The system of claim 1 wherein said structural members are in the form of tracks having slots therein, said adapters having members interengaging said slots.

10. The system of claim 1 comprising a bulkhead member attached to said support members wherein said bulkhead member, said support members, and said retaining members form a pre-assembly secured to said recesses.

11. The system of claim 10 wherein vertical spacer means are inserted into opposing recesses, said pre-assembly being mounted on said spacer means, and said adapters being interlocked with said retaining members and said spacer means.

12. The system of claim 10 wherein said adapters support said pre-assembly.

13. In a cargo container having opposite side walls with vertical recesses therein and a plurality of cargo containment systems spaced apart in a vertical direction, each of said systems comprising at least two retaining members having openings extending inwardly of said walls and support members extending transversely of said container between said walls and having ends inserted into said openings so that said retaining members engage and support said support members, said retaining members including apertures opposite said openings, and each of said systems further comprising separate removable adapters having body members interlocked with said apertures of said retaining members, said adapters having additional means for securing said system within selected ones of said recesses, whereby said adapters interlock said retaining members within said vertical recesses subsequently to said engaging of said retaining members and said support members.

14. The systems of claim 13 further comprising means for securing one of said systems to an adjacent system.

15. The systems of claim 1 wherein said retaining members have upper and lower surfaces each including apertures therein extending parallel to said recesses, spacer means inserted into selected ones of said recesses and into lower ones of said apertures for supporting said retaining members, and said adapters being mounted into the upper ones of said apertures to interlock with said retaining members and said spacer means.

16. The method of securing cargo in a cargo container having opposite side walls with vertical recesses therein by utilizing support members extending transversely between said walls; comprising the steps of assembling the ends of said support members within opposite retaining members, placing separate locking adapters within opposing selected ones of said recesses, and interlocking said adapters with said retaining members to secure said assembled support members and retaining members to said recesses, whereby said adapters interlock with said retaining members within said vertical recesses subsequently to said assembling of said support members within said retaining members.

17. The method of claim 16 wherein said support members have a fixed length and said retaining members have openings extending inwardly of said walls, comprising the further steps of placing said ends of said support members within and fully enclosing them within said openings, and maintaining said fixed length subsequent to said securing step.

18. The method of claim 16 wherein said retaining members have apertures opposite said openings, comprising the further steps of placing said adapters into said apertures to provide said interlocking.

19. The method of claim 16 comprising the further steps of placing first spacer means vertically into said opposing recesses subsequent to said assembling step, mounting said retaining means on said spacer means, placing second spacer means into said recesses and into said retaining means, and interlocking said retaining members and said spacer means with said adapters.

20. The method of claim 16 comprising the further steps of securing said adapters within said opposing recesses subsequent to said assembling step, and placing said retaining members on said adapters for support thereon.

21. The method of claim 20 comprising the further steps of placing first segments of hook and loop fasteners within said recesses, placing second interengaging segments of hook and loop fasteners on said adapters, and interengaging said first and second segments to provide said support.

22. The method of claim 20 comprising the further steps of placing structural members in the form of slotted tracks on opposing sides of said walls extending at right angles to said recesses, providing slot-engaging members on said adapters, and causing said slot-engaging members to interengage said slotted tracks to provide said support.

23. The method of claim 16 comprising the further steps of attaching a bulkhead member to said support members, and forming a pre-assembly of said bulkhead member, support members and retaining members before interlocking said adapters with said retaining members.

24. The method of claim 23 comprising the further steps of placing spacer means vertically into said opposing recesses, mounting said pre-assembly on said spacer means, and simultaneously interlocking said retaining members and said spacer means with said adapters.

25. The method of claim 23 comprising the further steps of securing said adapters within said opposing recesses, and mounting said pre-assembly on said adapters for support thereon.

26. The system of claim 5 wherein each of said adapters is a multi-surface module having a body including a projection defining said channel and having the same width as said spacer means to provide for said engagement, and an arm projecting from said body at right angles to said channel to provide for said insertion into said recesses.

* * * * *